United States Patent Office 3,243,393
Patented Mar. 29, 1966

3,243,393
DRYING OIL MODIFIED POLYCARBONATES OF BISPHENOLS, PROCESSES FOR THEIR PRODUCTION AND COMPOSITIONS PRODUCED THEREFROM
Oliver A. Barton, 49 Afton Drive, Florham Park, N.J., and Henry H. Richmond, Morristown, N.J.
No Drawing. Filed May 12, 1961, Ser. No. 132,999
(Filed under Rule 47(a) and 35 U.S.C. 116)
9 Claims. (Cl. 260—18)

This invention relates to processes for reacting the polycarbonates of bisphenols with drying oils, i.e., those natural and synthetic oils containing ethylenic unsaturation which, when exposed to the air, form a tough, elastic substance, and to the resulting drying oil modified polycarbonate products prepared by those processes. The invention is further directed to coating compositions containing those drying oil modified polycarbonates dispersed in solvents with or without the addition of a dryer such as is commonly employed in the preparation of lacquers, varnishes or paints which harden by oxidation by the air catalyzed by these dryers.

It is known to produce the polycarbonates of bisphenols by reacting a bisphenol in an alkaline organic solvent, such as pyridine, or an alkali metal bisphenate with phosgene or by esterification of the bisphenol by reaction with diphenyl carbonate. The polycarbonates of the bisphenols which can be reacted with the drying oils by the processes of our invention can be made in any of the above known manners.

Polycarbonate resins prepared by those procedures and applied by conventional methods as coatings to metals, e.g. aluminum or steel, or to wood or other substrates, in general have one or more disadvantages. For example, the films deposited from solutions on the substrate may be inflexible or have poor adhesion. When these coatings or films deposited on metal are baked at elevated temperatures (on the order of 200° C.) the adhesion may be improved, but the flexibility remains poor. The polycarbonate may not be soluble enough in common lacquer solvents, nor readily emulsifiable. The coating may be subject to spotting by water or attack by solvents.

For example, the polycarbonates of 2,2-bis(4-hydroxyphenyl)propane (also known as bisphenol-A) having desirably high molecular weights, above about 10,000, are soluble in certain solvents such as chlorinated hydrocarbons, e.g. methylene chloride, ethylene chloride, tetrachloroethane or trichloromethane, and in certain other solvents such as dimethyl formamide or pyridine. Some of these solvents are not suitable for use in the preparation of coating compositions because of their toxic nature. Others, particularly the chlorinated hydrocarbons, have high densities and require the use of a relatively large weight of the solvent to produce a given volume of coating composition as compared with compositions in which the aromatic solvents, such as toluene and xylene, or their mixtures with other solvents such as acetone or a chlorinated hydrocarbon, are commonly employed with gums, resins or polymers of suitable solubility in these solvents. Other disadvantages in connection with using the polycarbonates of bisphenols in coating compositions will appear hereinafter.

We have now discovered that those polycarbonates of bisphenols react with drying oils containing ethylenic unsaturation to radically alter the solubility and other characteristics of the resulting products as compared with the polycarbonates themselves. These reaction products are suitably used for preparing coating compositions in which the drying oil modified polycarbonates form suitably homogeneous dispersions in water or solutions in solvents entirely or principally composed of aromatic hydrocarbons. We have found that such coating compositions containing drying oil modified polycarbonates of the bisphenols can be prepared having desired viscosities for application to substrates by spraying or brushing and dried either by evaporation of the solvent or, with the chemical dryers commonly used in coating compounds present to promote oxidation in air, by air drying with or without baking at elevated temperatures. The protective films thus deposited on the substrate give a clear coating of even surface and high brilliancy, strongly adhering to the substrate and suitably resistant to impact and to alkalies and acids. Furthermore, these coatings have adequate elongation to adapt themselves to deformation of the substrates to which coating compositions of the resin-in-vehicle type are commonly applied.

In carrying out the processes of our invention for the production of drying oil modified polycarbonates, a mixture is prepared of a polycarbonate of a bisphenol having a molecular weight of about 10,000 to about 100,000 with a drying oil, preferably a drying oil in which one or more of its individual constituents contain conjugated double bonds. Such mixtures contain (by weight) 10 to 90 parts of the polycarbonate with 90 to 10 parts of the drying oil. The mixture is heated at temperatures at which it forms a clear fluid and the clear fluid is heated at temperatures at which it is maintained fluid until the resulting reaction product remains clear when cooled to room temperature, i.e. to about 20° C. to about 30° C. Thereupon the heating of the reaction product is discontinued and it is permitted to cool.

To accelerate the reaction of the polycarbonate and drying oil, it is well to heat the clear fluid first formed at temperatures of at least about 250° C. until the reaction product remains clear at room temperature. In no case, however, should the temperatures be excessively high or the time the resulting oleoresinous product is at high temperatures be unduly prolonged, since either one of these conditions can cause decomposition and undue darkening of the product. In view thereof, when temperatures substantially about 300° C. are employed, it is best to provide some positive cooling means to lower the temperature of the product at least to below 300° C., at which lower temperatures there is little tendency towards undue discoloration of the product.

In our preferred procedure for reacting a bisphenol having a melting point above about 300° C. with the drying oil, the mixture of drying oil and polycarbonate is initially heated to and at a temperature above about 300° C. to fuse the polycarbonate in the drying oil and form a clear fluid. This clear fluid is then heated at lower temperatures in the range above 250° C. to and including about 300° C. until the resulting reaction product remains clear at room temperature and thereupon heating of the reaction product is discontinued.

A convenient procedure for determining when the heating of the reaction mixture should be discontinued, is to remove a small sample of the material being heated and drop it into a metal dish in which the sample cools quickly to room temperature. Visual observation determines whether it remains clear rather than becoming opaque.

Except in the case of the fast bodying drying oils such as tung oil, variations in the time of heating have far less effect on the degree of their reaction and the characteristics of the oleoresinous product than do variations in temperature. As pointed out above, high temperatures and prolonged heating tend to darken the product. Undue darkening of the product, in view of its intended use, is avoided by employing lower temperatures and shorter times of heating.

The use of a fast bodying drying oil, such as tung oil, presents a special case in that such oils alone cannot be heated to the required temperatures for forming a clear fluid with the polycarbonates without the drying oil itself gelling to produce a hard cross-linked resin. However, as will be more specifically illustrated in one of the examples, by first heating the polycarbonate resin with a slower bodying drying oil which does not gel at temperatures of about 250° C. or higher to form the clear fluid with this oil and thereafter bringing the temperature of this fluid to about 200° C. to about 250° C., the fast bodying drying oil may then be added and reacted at these temperatures with the product first formed to obtain the desired reaction product with the fast bodying drying oil which remains clear at room temperature.

In addition to the foregoing conditions to be observed in preparing our drying oil modified polycarbonates of bisphenols the precautions generally observed and measures taken by those skilled in the cooking of drying oils with resins should be observed. For example, the mixture to be heated should be substantially anhydrous. Limitations in temperatures and times of heating the polycarbonate-drying oil reaction mixture, particularly at temperatures of about 300° C. and higher, to avoid undue decomposition of the materials present as shown by too great a darkening of the reaction product are particularly pointed out above. Undue exposure to the air is also avoided because of the oxidation which is known to occur when heating drying oils with resins. Accordingly, covered vessels should be used. In our preferred procedure the heated mixture of polycarbonate and drying oil is blanketed with a non-oxidizing inert atmosphere such as nitrogen, carbon dioxide or combustion products of an oil or gas used for heating the materials to the required temperatures.

The specific characteristics of the drying oil modified bisphenol polycarbonates of our invention and the uses for which the several products are best suited will vary with the particular driving oils and polycarbonates employed, and the ratios of polycarbonate to drying oil used in preparing the products. In general, we prefer to react with the drying oil a pisphenol polycarbonate having a molecular weight of about 20,000 to about 30,000.

Our drying oil modified bisphenol polycarbonates can be produced by the processes herein described from the polycarbonates, prepared in known manners by reaction, of bisphenols having the structure

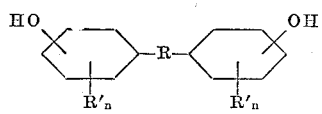

in which R is a divalent alkane or saturated alicyclic radical or a divalent aryl or aralkyl radical containing only aromatic unsaturation, R' is a monovalent alkane radical and $n$ is an integer from 0 to 4, and the derivatives of those bisphenols which contain halogen attached to carbon in an aromatic ring, in an alkaline organic solvent such as pyridine or reacting an alkali metal bisphenate of said bisphenols with phosgene or by esterification of the bisphenol by reaction with diphenyl carbonate. The polycarbonates of the bisphenols having the above structure in which each of the two hydroxyl groups is in the 4-position of a phenylene radical and are linked through phenylene radicals, each pair of which is linked through a single carbon atom of a divalent alkane radical, are the preferred bisphenol polycarbonates reacted with drying oils in accordance with our invention.

Examples of those bisphenols whose polycarbonates can be reacted with the drying oils to form the drying oil modified polycarbonates in accordance with our invention, are:

2,2-bis(4-hydroxyphenyl) propane,
Bis(4-hydroxyphenyl) methane,
1,1-bis(4-hydroxyphenyl) cyclohexane,
1,1-bis(4-hydroxy-3-methylphenyl) cyclohexane,
2,2-bis(2-hydroxy-4-tert-butylphenyl) propane,
3,4-bis(4-hydroxyphenyl) hexane,
1,1-bis(4-hydroxyphenyl)-1-phenyl ethane,
2,2-bis(4-hydroxyphenyl) butane,
2,2-bis(4-hydroxyphenyl) pentane,
3,3-bis(4-hydroxyphenyl) pentane,
2,2-bis(4-hydroxyphenyl)-3-methyl butane,
2,2-bis(4-hydroxyphenyl) hexane,
2,2-bis(4-hydroxyphenyl)-4-methyl pentane,
2,2-bis(4-hydroxyphenyl) heptane,
4,4-bis(4-hydroxyphenyl) heptane, and
2,2-bis(4-hydroxyphenyl) tridecane,
1,4-bis(4-hydroxycumyl) benzene (also known as dicumylphenol), as well as the halogen derivatives of those bisphenols, e.g.

2,2-bis(4-hydroxy-3-chlorophenyl) propane,
2,2-bis(4-hydroxy-3,5-dibromophenyl) propane and
1,4-bis(4-hydroxycumyl) tetrachlorobenzene.

Coating compositions containing the drying oil modified polycarbonates of bisphenols of our invention are prepared in the usual manner employing suitable solvents for those oleoresinous materials. In general, they are soluble in the commonly employed aromatic solvents or mixtures of those aromatic solvents with other solvents such as lower ketones, e.g. acetone, or the chlorinated lower aliphatic solvents, such as methylene chloride. Coating compositions can be prepared containing about 10% to about 50% by weight of these oleresinous products in solution in solvents principally composed of aromatic hydrocarbons. Also aqueous dispersions of the oleoresinous drying oil modified polycarbonates suitable for use as coating compositions, containing about 10% to 40% by weight of the resin, can be prepared by dispersing them in water by means of emulsifying agents.

The dryers commonly employed in oleoresinous coating compositions are also employed in our compositions. Examples of suitable dryers are lead, manganese, cobalt and zinc in the form of resinates, linoleates, naphthenates and octyl-oxyacetates. We prefer to use both a cobalt top dryer, such as cobalt naphthenate, and a manganese through dryer, such as manganese naphthenate. The usual plasticizers promoting long life of the films deposited from the coating compositions and pigments may also be incorporated in the solutions or dispersions of our drying oil modified polycarbonates.

In preparing the water dispersed emulsion coating compositions, as in the case of other oleoresinous materials, the resin is dispersed in water by means of an emulsifying agent. This is preferably an anionic or nonionic emulsifier when pigmented coating compositions are to be prepared because of their known stability toward certain pigments in the presence of which other emulsifiers are unstable. The best results have been obtained employing from 10 to 50 parts of the polycarbonate with 90 to 50 parts of a drying oil and dispersing the product in water employing a nonyl phenoxy polyoxyethylene ethanol, sold under the trademark "Igepal CO–850" or an alkyl phenyl ether of polyethylene glycol, sold under the trademark "Tergitol NP–35" or "Tergitol NP–40." In these water emulsion compositions the dryers employed can be those which are dispersible in water, such as emulsive dryers of cobalt and manganese salts of organic acids which are available on the market under the trademark "Witco." Other additives commonly employed in these emulsion coating compositions may also be employed, including anti-foaming agents, protective colloids, such as hydroxymethyl cellulose which prolongs the shelf life of emulsion coating compositions and redispersibility if and when settling of the emulsion occurs, also plasticizers and pigments. We have found that when "Igepal CO-850" is employed as emulsifying agent it also acts as a plasticizer for the film deposited on substrates by our coating compositions.

In preparing coating compositions containing our drying oil modified polycarbonates, the hardness and gloss of the coatings deposited from their solutions or dispersions are generally greater as increased ratios of the bisphenol polycarbonates to the drying oil are employed in the preparation of the oil modified polycarbonates. The presence of unduly large gel particles, however, tends to reduce the gloss and make the film surface appear uneven and spotty to the eye. This is avoided by employing for reaction with the polycarbonate a drying oil substantially free of large gel particles or by providing adequate agitation in preparing dispersions of the oil modified polycarbonate in a solvent or in water to produce a shearing force in the mix to break down the gel particles. Both of these measures may be employed when necessary or desirable.

The processes and products of our invention will be more completely illustrated and described by the following examples.

In the examples, unless otherwise specified, the amounts of materials given in parts or percentages are by weight. The inherent viscosities ($N_i$) given are those calculated from the effluent times of an 0.1% solution of the oleoresinous reaction product of the drying oil and the polycarbonate in ethylene chloride and of the ethylene chloride solvent measured in an Ostwald-Fenske viscometer at 25° C., using the following equations:

$$Nr = \frac{\frac{T}{T'}-1}{C}$$

$$N_i = N_r - 0.02$$

In these equations T and T' are the effluent times of the solution of the resin and of the solvent, respectively, and C is the concentration of the resin in the solution in grams/100 cc. of solvent.

*Example 1.*—A vessel was provided with a stirrer, a reflux condenser and a tube by means of which nitrogen gas could be introduced to flush out air and to prevent air entering through the condenser. A polycarbonate of bisphenol-A of molecular weight about 20,000 amounting to 70 parts and 30 parts of dehydrated castor oil were introduced into the vessel. The system was flushed out with nitrogen gas and with this gas continuing to be passed into the vessel the mixture of solid polycarbonate and oil was heated from room temperature to 300° C. over a period of ¾ hour and was then maintained at that temperature for ½ hour. The polycarbonate and oil formed a clear fluid and the reaction product was a clear amber, brittle solid when cooled to room temperature.

A 3 gram sample of this product was extracted with 20 cc. of ethyl ether. This left 1.5 grams of ether insoluble material which completely dissolved in 10 cc. of toluene. The ether solution was evaporated to dryness and the solid extracted with 15 cc. of heptane. Evaporation of the heptane extract showed less than 0.1 gram of heptane soluble material was present in the ether soluble fraction of the oil modified polycarbonate.

The infra red absorption spectrum of the heptane soluble fraction corresponded to the absorption spectrum of heptane itself, showing the presence of no unreacted dehydrated castor oil in the product of this example, since that oil is soluble in both ether and heptane. The polycarbonate of bisphenol-A is insoluble in both ether and toluene. The partial solubility in ether of the drying oil modified polycarbonate product and the solubility in toluene of that portion of the product which was insoluble in ether showed no unreacted polycarbonate was present in the product. In other words the bisphenol polycarbonate and the drying oil had completely reacted with each other to form a new chemical compound. Furthermore, since the polycarbonate is insoluble in the drying oil at room temperature, their reaction at the elevated temperatures is shown by the product being clear at room temperature rather than containing particles of solid bisphenol in the drying oil.

*Example 2.*—The procedure of Example 1 was employed for reacting 70 parts of the polycarbonate of bisphenol-A with 30 parts of dehydrated castor oil, varying the reaction conditions only in heating the reaction mixture at 290° C.–300° C. for a period of 2 hours. Cooled to room temperature the resulting product was a clear, reddish amber, solid having an $N_i$ of 0.124. This was dissolved in xylene to give a coating composition of suitable viscosity containing 17% of the oleoresinous product. As dryers .05% cobalt naphthenate and .025% manganese naphthenate, based on the weight of the drying oil present in the oleoresinous product, were added. This coating composition was applied to a steel sheet and allowed to air dry for a period of 24 hours. The resulting protective film on the steel substrate showed the following properties:

Adhesion (tape test) _____ Excellent.
Elongation (mandrel test) _____ Excellent, no cracking of film.
Impact resistance _____ 28"/lbs.
Gloss (photovolt) _____ 93.
Chemical resistance:
    5% NaOH solution _____ No effect for 8 hours, film removed after 16 hrs. contact.
    10% acetic acid solution ____ Slight brown stain.
Hardness (rocker) _____ 72 to 76.
Water spotting _____ None.

A steel plate was similarly coated with a coating composition prepared from a solution of the same polycarbonate of bisphenol-A and the dryers without having reacted it with a drying oil. After the film of polycarbonate had been deposited by evaporation of the solvent it was necessary to bake it at 150° C.–160° C. for 15–20 minutes. Unless baked the coating fails under the adhesion and elongation tests. After baking it had a lower impact resistance, a 2½ hours initial resistance to 5% NaOH, and a hardness of 46–48 as compared with the superior properties of the air-dried film of our castor oil modified polycarbonate of this Example 2.

*Example 3.*—The procedure of Example 1 was employed for heating a mixture of 15 parts of the polycarbonate of bisphenol-A with 85 parts of linseed oil to 270°–280° C. and maintaining it at these temperatures for 1½ hours. The resulting reaction product, cooled to room temperature, was a clear, semi-solid material having an $N_i$ of .0812.

This product was dissolved in xylene to obtain a suitably workable coating composition, with addition of the same dryers in the same percentages as in Example 2. This composition was used for coating a steel plate and allowed to air-dry for 24 hours. The resulting protective film on the steel plate had the following properties:

Adhesion (tape test) _____ Excellent.
Elongation (mandrel test) _____ Excellent.
Impact resistance _____ 28"/lbs.
Gloss _____ 87.
Hardness (rocker) _____ 12–14.
Chemical resistance:
    5% NaOH solution _____ 2 hrs.
    5% $Na_2CO_3$ solution _____ No effect.
    10% acetic acid solution _____ Slight brown stain.
Water spotting _____ None.

The most complicated solvent system for the industrial application of a coating is a spray solvent system. In such a system, it is necessary to have a fast evaporating solvent to promote fast dry, a medium evaporating solvent, often used as a diluent, and a slow evaporating solvent or a resin flow promoting agent. The correct proportions of these solvents allow the formulator latitude in the rate of dry and at the same time to obtain high gloss of the resultant film.

*Example 4.*—In view of those requirements, the procedure of Example 1 was employed for reacting a mixture of 70 parts of the polycarbonate of bisphenol-A with 30 parts of dehydrated castor oil by heating the mixture to 300° C. and maintaining it at that temperature for 2 hours. The reaction product was then a clear fluid. Cooled to room temperature it formed a clear, hard, tough, reddish brown solid. The drying oil modified polycarbonate resin thus obtained was dissolved in the following solvent mixtures and the dryers used in Example 2 added, to form sprayable coating compositions containing 15% of the resin.

```
                                                  Percent
Mixture No. 1:
    Acetone _____ 40
    Toluene _____ 40
    "Solvesso" 100 _____ 20
Mixture No. 2:
    Acetone _____ 20
    Toluene _____ 60
    "Solvesso" 100 _____ 20
Mixture No. 3:
    Acetone _____ 40
    Toluene _____ 40
    Xylene _____ 20
Mixture No. 4:
    Methylene chloride _____ 30
    Toluene _____ 50
    "Solvesso" 100 _____ 20
```

"Solvesso" 100 is an aromatic solvent prepared from petroleum, marketed under the trade mark "Solvesso" for use in coating compositions.

All of the foregoing solutions of oil modified polycarbonate resin had excellent flow properties. They dried to touch in air at 70° F. and 50% relative humidity as follows:

| Solvent Mixture | 1 | 2 | 3 | 4 |
|---|---|---|---|---|
| Drying Time (Minutes) | 15 | 25 | 20 | 20 |

In every case a clear, protective film of excellent continuity was deposited on the substrate. The properties of these films were similar to those given for the films from the coating composition of Example 2 above.

*Example 5.*—A dehydrated castor oil modified polycarbonate of bisphenol-A prepared as described in Example 2, was heated to its softening temperature and spread on one side each of two pieces of white pine board. These were then pressed together on the two faces spread with the drying oil modified polycarbonate and put in a press at 125° C. for 10 minutes. At this temperature the resin oozed out at the sides of the pieces. The thus joined pieces of wood were routed out at the glue joint along one edge against the grain of the wood and inserted in the jaws of a Thwing-Albert tensile tester. Increasing loads were applied until the pieces broke apart. The wood first broke along a line away from the resin bonded interface.

Another resin similarly prepared by reaction of 70 parts of the polycarbonate of bisphenol-A and dehydrated castor oil, was melted and spread on two pieces of white pine wood. These were pressed together at the melt temperature of the resin of 110° C. and then cooled under token pressure. In the Thwing-Albert tester the wood also broke before a break at the bonded interface.

As has been previously pointed out, our preferred procedure for reacting the polycarbonates of bisphenols with the drying oils is to heat their mixture to a temperature above about 300° C. at which the polycarbonate fuses in the drying oil and forms a clear fluid therewith, and then heating this fluid at above 250° C. to about 300° C. until the resulting reaction product remains clear at room temperature. The following examples 6–13 illustrate these preferred processes for reacting various weight ratios of the polycarbonate and drying oils. In all of these examples the polycarbonate of bisphenol-A and the equipment described in Example 1 were employed with nitrogen gas used to initially sweep out the air and to provide a blanket of non-oxidizing gas over the reaction mixture while it was being heated. In each case the initial mixture of polycarbonate and drying oil was heated rapidly to about 340° C. to cause the polycarbonate to melt and fuse with the drying oil. The liquid was then cooled to about 340° C. to cause the polycarbonate to melt and fuse with the drying oil. The liquid was then cooled to about 300° C. and maintained at that temperature for the required period to form a clear product when cooled to room temperature.

*Table I*

| Ex. | Ratio of Polycarbonate to Drying Oil | Reaction Time at 300° C. | Character of Product | | |
|---|---|---|---|---|---|
| | | | At room temperature | Gardner Viscosity | Acid No. |
| | (DEHYDRATED CASTOR OIL) | | | | |
| 6 | 10/90 | 9 mins | Pale amber oil | V | 3.0 |
| 7 | 30/70 | ½ hr | ____do____ | Z | 2.0 |
| 8 | 50/50 | ¾ hr | Pale amber oil to semisolid | | 0.8 |
| 9 | 60/40 | 1 hr | Pale amber semisolid | | 0.3 |
| 10 | 70/30 | 1 hr | Amber solid | | 0.3 |
| 11 | 90/10 | 2 hrs | Brittle solid | | 0.3 |
| | (LINSEED OIL) | | | | |
| 12 | 50/50 | 1¼ hrs | Pale amber viscous oil to semisolid. | | |
| | (SOYA OIL) | | | | |
| 13 | 50/50 | 1½ hrs | Dark amber, semisolid | | |

All of the oleoresinous products of these examples were soluble in ethyl benzene, toluene, xylene and ether. They were moderately soluble in acetone, but were insoluble in heptane and other aliphatic hydrocarbons.

The hardness of protective films deposited on substrates from solutions of the drying oil modified bisphenol polycarbonates can be modified by employing different ratios of the polycarbonate to the drying oil or different drying oils in the preparation of the oleoresinous product. This is illustrated in the following Table II for the oleoresinous products prepared from a polycarbonate of bisphenol-A having a molecular weight of about 20,000 with the drying oils. These materials were reacted by our preferred process described in Examples 6 to 13. The resulting reaction products were dissolved in toluene as solvent with addition of the same dryers in the same amounts as in Example 2, to form coating compositions of suitable workability containing 15% of the drying oil modified polycarbonate. These compositions were applied to steel plates and air dried over night. The protective films deposited on the steel plate were baked for ½ hour to 125° C.

*Table II*

| Ratio of Polycarbonate to Drying Oil | Film Hardness— Sward-Rocker |
|---|---|
| Dehydrated Castor Oil: | |
| 20/80 | 18 |
| 50/50 | −20 38 |
| 60/40 | −40 52 |
| 70/30 | 65 |
| Linseed Oil—50/50 | 78 |
| Soya Oil—50/50 | 24 |

The character of the coating compositions can also be modified by employing the higher molecular weight polycarbonates of bisphenol-A to give oleoresinous products from which coating compositions can be prepared which form protective films of increased hardness.

*Example 14.*—A polycarbonate of bisphenol-A having a molecular weight of about 60,000 was mixed with 80 parts dehydrated castor oil to 20 parts of the polycarbonate and the mixture was heated to 365° C. at which temperature the polycarbonate resin fused to form a clear liquid with the drying oil. This liquid was cooled to 300° C. and after 20 minutes at that temperature the product remained clear when cooled to room temperature.

A 20% by weight solution of the resulting oleoresinous product in 40% acetone, 40% toluene, 20% "Solvesso 100" as solvent was prepared with addition of the same dryers in the same amounts as used in preparing the coating composition of Example 2. This composition was applied to a steel plate, air-dried over night and baked for ¼ hour at 120° C. The protective film thus formed on the steel plate had a Sward hardness of 36, as compared with the 18–20 value shown in above Table II for the film from the coating composition prepared from the oleoresinous reaction product of the polycarbonate having a molecular weight of about 20,000 and dehydrated castor oil in the same 20/80 ratio as used in this Example 14.

*Example 15.*—Sixty parts of the polycarbonate of bisphenol-A and 40 parts of dehydrated castor oil were reacted by the procedure described in above Example 9. The resulting drying oil modified polycarbonate product was dissolved in a solvent composed of 40 parts acetone, 40 parts toluene and 20 parts "Solvesso" to form a solution containing 20 wt. percent of the drying oil modified polycarbonate. With this solution there was incorporated 10% "Igepal CO–850" based on the weight of the resin and .05 wt. percent cobalt naphthenate and .025 wt. manganese naphthenate based on the drying oil employed in making up the resin present in the solution.

This coating composition was sprayed on a steel plate and after drying to the touch, the film deposited on the steel was baked at 150° C. for ½ hour. The resulting protective film had the following properties:

Adhesion (tape test) _____ No film loss.
Elongation (mandrel test) _____ No cracking.
Impact resistance _____ 28″/lbs.
Gloss _____ 95.
Chemical resistance—24 hours contact:
    5% NaOH _____ No film removal.
    10% acetic acid _____ Brown stain.
Water spotting _____ No effect.
Hardness (rocker) _____ 52.
Scrub resistance (Gardner test machine) 5000 cycles.
Stain resistance:
    Wax pencil _____ No effect.
    Lipstick _____ No effect.

In addition to the organic solvent coating compositions heretofore described, the drying oil modified polycarbonates of our invention can be employed in the preparation of coating compositions containing those resins emulsified in water employing suitable emulsifying agents and dispersion techniques. Our preferred method of preparing these water emulsions is described in the following example.

*Example 16.*—A drying oil modified polycarbonate was prepared by the process of Example 9 above. This resin was emulsified in water in the ratio of 20 parts resin to 80 parts water employing 10% "Igepal CO–850" by weight of the resin as an emulsifier. One-half of this emulsifier was added to the resin and the mixture heated until it was quite fluid. The other half of the emulsifier was added to the water and the water-emulsified solution was heated to 60°–70° C. The hot, fluid resin emulsifier mixture, which can be at a temperature up to about 200° C., was added dropwise to the warm water-emulsifier solution while the latter is rapidly stirred. After addition of the resin-emulsifier is completed the resulting emulsion is best filtered through a 20 mesh sieve to remove any particles of resin which may not have been emulsified.

To the emulsion of the resin thus prepared, 0.05% cobalt and 0.025% manganese emulsive dryers, marketed under the "Witco" trademark, were introduced as a previously prepared dispersion of these dryers in a small volume of water, about 5 cc. of water for every 1 gm. of the dryers. The addition to the resin-water emulsion of these dryers thoroughly dispersed in water prevents "puddling" of the dryers as the coating composition dries. There was also added to the water emulsion 0.2 wt. percent, based on the aqueous emulsion, of a protective colloid. This was a sodium carboxymethylcellulose of a viscosity grade 120H. The presence of this protective colloid permitted the emulsion to be concentrated by evaporation of water from 20% solids content as initially prepared to a 40% solids content. The concentrate had a shelf stability greater than nine months.

As the ratio of polycarbonate to drying oil employed in preparing the oleoresinous resin is increased above 60/40 emulsification of the product in water becomes more difficult and the resulting emulsions become less stable. For the preparation of water emulsions, therefore, it is best to employ the oil modified resins prepared by reacting no more than about the 60/40 ratio of polycarbonate of bisphenol-A to drying oil of the above Example 15. As to the emulsifier, an alkyl phenyl ether of polyethylene glycol, available on the market under the trade names of "Tergitol Nonionic NP–35" and "Tergitol Nonionic NP–40" can be substituted for the "Igepal CO–850" employed in that example.

*Example 17.*—Forty parts of methyl linoleate were heated with 60 parts of the same bisphenol-A polycarbonate as was used in Example 1 for 45 minutes at 300° C. The resulting reaction product was a clear, oleoresinous material when cooled to room temperature. It is suitable for use in the preparation of coating compositions in the same manners as described above for other drying oil modified polycarbonate resins.

*Example 18.*—Eighteen parts of a polycarbonate of dicumylphenol having a molecular weight of about 25,000–30,000 and 12 parts of dehydrated castor oil were heated under an atmosphere of nitrogen gas to 250° C. over a period of 15 minutes. The mixture became a clear fluid at that temperature, and the clear fluid was further heated at 250° C. for one hour. At the end of this time the resulting product, cooled to room temperature, was a clear amber, tacky semi-solid. Throughout the heating of the materials they were continuously stirred.

The oleoresinous product thus obtained was soluble in ether, benzene, toluene, xylene and ethylbenzene and was partially soluble in acetone. It had an $N_i$ of 0.05.

A coating composition was prepared by dissolving this oleoresinous compound in a solvent consisting of 40% acetone, 40% toluene and 20% xylene to form a 20% solution of the oleoresinous compound in the solvent. Cobalt naphthenate and manganese naphthenate, amounting to .05% and .025%, respectively, by weight of the oleoresinous product, were added as dryers. A bonderized steel plate was coated with this coating composition and dried to touch in air, following which it was baked for ½ hour at 125° C. The film left on the steel plate was about 1.5 mil thick and after baking for ½ hour at 125° C., had the film properties shown in the following Table III. In the table those properties are compared with the properties of a film deposited from a solution of the same polycarbonate of dicumylphenol used in preparing the oil modified product of this example dissolved in a solvent for that polycarbonate, with the same dryers added and similarly air-dried and baked at 125° C.

Table III

| Film Property | Castor Oil Modified dicumylphenol polycarbonate | Dicumylphenol Polycarbonate |
|---|---|---|
| Adhesion (Tape Test) | No film loss | Complete loss of film. |
| Elongation (Mandrel Test) | No cracking | Loss of film at small end of mandrel. |
| Impact Resistance | 28"/lbs | 28"/lbs. |
| Gloss (Photovolt) | 91 | 98. |
| Rocker Hardness | 72 | 56. |
| Scrub Resistance (Gardner Test Machine) | 5,000 cycles | 500 cycles. |
| Stain Resistance: | | |
| (Wax Pencil) | No effect | No effect. |
| (Lipstick) | do | Do. |
| Chemical Resistance: | | |
| (5% NaOH solution) | No effect after 24 hrs. | Removed film. |
| (10% acetic acid solution) | do | Browned and removed film. |
| Water | do | No effect. |

*Example 19.*—Thirty parts of a bisphenol-A polycarbonate of molecular weight of about 20,000, was mixed with 60 parts of dehydrated castor oil and the mixture heated to 300° C. and at that temperature for a period of ½ hour. The reaction product was then cooled to 250° C. and 10 parts of tung oil were added. After holding the mixture for 5 minutes at 250° C. for reaction of the tung oil, the material was cooled to room temperature yielding a clear, pale amber viscous oil. A toluene solution of this oil, with .05% cobalt naphthenate and .025% manganese naphthenate as dryers added, these percentages being based on the total amount of drying oils used in preparing the resin, was coated on a substrate, allowed to air dry and the deposited film baked at 125° C. for ½ hour. The film coating the substrate had a hardness of 22 (Sward).

We claim:
1. An oleoresinous reaction product of a drying oil and a bisphenol polycarbonate prepared by mixing a drying oil and a member of the group consisting of the polycarbonates of bisphenols having the structure

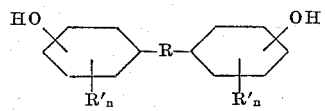

in which R is a member of the group consisting of the divalent alkane and saturated alicyclic radicals and the divalent aryl and arylalkyl radicals containing only aromatic unsaturation, R' is a monovalent alkane radical and n is an integer from 0 to 4, and the polycarbonates of the halogen derivatives of those bisphenols which contain the halogen attached to carbon in an aromatic ring, prepared by reacting the bisphenol in an alkaline organic solvent or by reacting an alkali metal bisphenate with phosgene or by esterification of the bisphenol by reaction with diphenyl carbonate, said polycarbonate having a molecular weight of about 10,000 to about 100,000 and said mixture containing 10 to 90 weight parts of said polycarbonate and 90 to 10 weight parts of said drying oil, heating said mixture at temperatures at which it forms a clear fluid, and heating said fluid at temperatures at which it is maintained fluid, but not excessively higher, until the resulting reaction product remains clear at room temperature, and thereupon discontinuing heating said reaction product, said oleoresinous reaction product containing substantially no free unreacted drying oil.

2. An oleoresinous reaction product of a drying oil and a bisphenol according to claim 1 wherein the drying oil contains conjugated double bonds.

3. An oleoresinous reaction product according to claim 1 wherein the drying oil contains conjugated double bonds and wherein the bisphenol is 1,4-bis(4-hydroxycumyl) benzene.

4. An oleoresinous reaction product of a drying oil and a bisphenol according to claim 1 wherein the drying oil contains conjugated double bonds and the bisphenol is 2,2-bis(4-hydroxyphenyl) propane.

5. A coating composition containing by weight between about 10% and about 50% of the oleoresinous reaction product according to claim 1 in solution in a solvent liquid principally composed of aromatic hydrocarbons.

6. A coating composition containing by weight between about 10% and about 50% of the oleoresinous reaction product of claim 2 in solution in a solvent liquid principally composed of aromatic hydrocarbons.

7. A coating composition containing by weight between about 10% and about 40% of the oleoresinous reaction product of claim 2 dispersed in water.

8. A coating composition containing by weight between about 10% and about 50% of the oleoresinous reaction product of claim 3 in solution in a solvent liquid principally composed of aromatic hydrocarbons.

9. A coating composition containing by weight between about 10% and about 50% of the oleoresinous reaction product of claim 4 in solution in a solvent liquid principally composed of aromatic hydrocarbons.

References Cited by the Examiner

UNITED STATES PATENTS

| 2,058,394 | 10/1936 | Arvin | 260—47 |
| 3,157,606 | 11/1964 | Deanin et al. | 260—18 |
| 3,164,564 | 1/1965 | Butterworth | 260—47 |

FOREIGN PATENTS

| 221,192 | 4/1959 | Australia. |
| 546,377 | 3/1956 | Belgium. |

OTHER REFERENCES

Hafeli: Canadian Paint and Varnish Magazine, September 1951 (pp. 34, 36 and 38).

The Oil and Colour Trades Journal, Sept. 17, 1937, p. 828.

Varnish and Paint Technology, Von Fischer; Reinhold Pub. Corp., New York, 1948; pages 320–328.

LEON J. BERCOVITZ, *Primary Examiner.*

ALFONSO D. SULLIVAN, MILTON STERMAN, DONOLD E. CZAJA, RONALD W. GRIFFIN, C. WARREN IVY, *Assistant Examiners.*